United States Patent
Newhart, III

(10) Patent No.: US 6,883,282 B1
(45) Date of Patent: Apr. 26, 2005

(54) SIDING BOARD AND CONDUIT HOLDING SYSTEM

(76) Inventor: Russell G. Newhart, III, R.R. #1 Box 1088, Laceyville, PA (US) 18623

( * ) Notice: Subject to any disclaimer, the term of this patent is extended or adjusted under 35 U.S.C. 154(b) by 65 days.

(21) Appl. No.: 10/331,309

(22) Filed: Dec. 31, 2002

(51) Int. Cl.$^7$ .................................................. E04B 2/00
(52) U.S. Cl. ...................... 52/287.1; 52/288.1; 52/272; 52/58; 52/220.5; 52/716.1; 52/717.01; 174/68.1; 174/68.3; 174/70 R
(58) Field of Search ........................ 52/287.1, 288.1, 52/272, 276, 58, 220.5, 716.1, 717.01, 220.1; 174/288.7, 68.1, 68.3, 69, 70 R

(56) References Cited

U.S. PATENT DOCUMENTS

| | | | | |
|---|---|---|---|---|
| 3,003,794 A | * | 10/1961 | Burley | ...................... 285/179.1 |
| 4,349,220 A | * | 9/1982 | Carroll et al. | ............ 285/151.1 |
| 4,423,284 A | * | 12/1983 | Kaplan | ......................... 174/101 |
| 4,841,699 A | | 6/1989 | Wilson et al. | |
| 5,024,614 A | * | 6/1991 | Dola et al. | ................... 439/114 |
| 5,214,890 A | * | 6/1993 | Levitan et al. | .............. 52/220.7 |
| 5,243,800 A | * | 9/1993 | Olbrich | ....................... 52/287.1 |
| 5,274,972 A | * | 1/1994 | Hansen | ....................... 52/220.5 |
| 5,792,993 A | * | 8/1998 | Rinderer | ...................... 174/101 |
| 5,836,113 A | | 11/1998 | Bachman | |
| 5,850,717 A | * | 12/1998 | Schiedegger et al. | ....... 52/288.1 |
| 6,084,180 A | * | 7/2000 | DeBartolo et al. | ............. 174/95 |
| 6,235,988 B1 | * | 5/2001 | Karst et al. | .................... 174/48 |
| D448,737 S | * | 10/2001 | Nakamura | .................. D13/155 |
| 6,344,611 B1 | * | 2/2002 | Ewer et al. | .................... 174/48 |
| 6,469,250 B1 | * | 10/2002 | Decore et al. | ................. 174/95 |
| 6,494,414 B1 | * | 12/2002 | Benito-Navazo | ........... 248/68.1 |

* cited by examiner

Primary Examiner—Carl D. Friedman
Assistant Examiner—Nahid Amiri

(57) ABSTRACT

A siding board and conduit holding system for forming the border of a dwelling wall while holding wiring and other like conduits comprises a plurality of elongated compartments each including a first wall, a second wall, a third wall, a fourth wall and a pair of end walls. The first and third walls are positioned opposite of each other. The second wall has a break therein to define a first portion and a second portion. The first portion is frictionally couplable to the second portion. The third wall is pivotally coupled to the fourth wall such that the third wall defines a door. At least one of the elongated compartments may be positioned along an edge of the dwelling wall such that the first wall is attached to the dwelling wall. Wiring is positionable within the compartments to be extended along the dwelling wall.

6 Claims, 2 Drawing Sheets

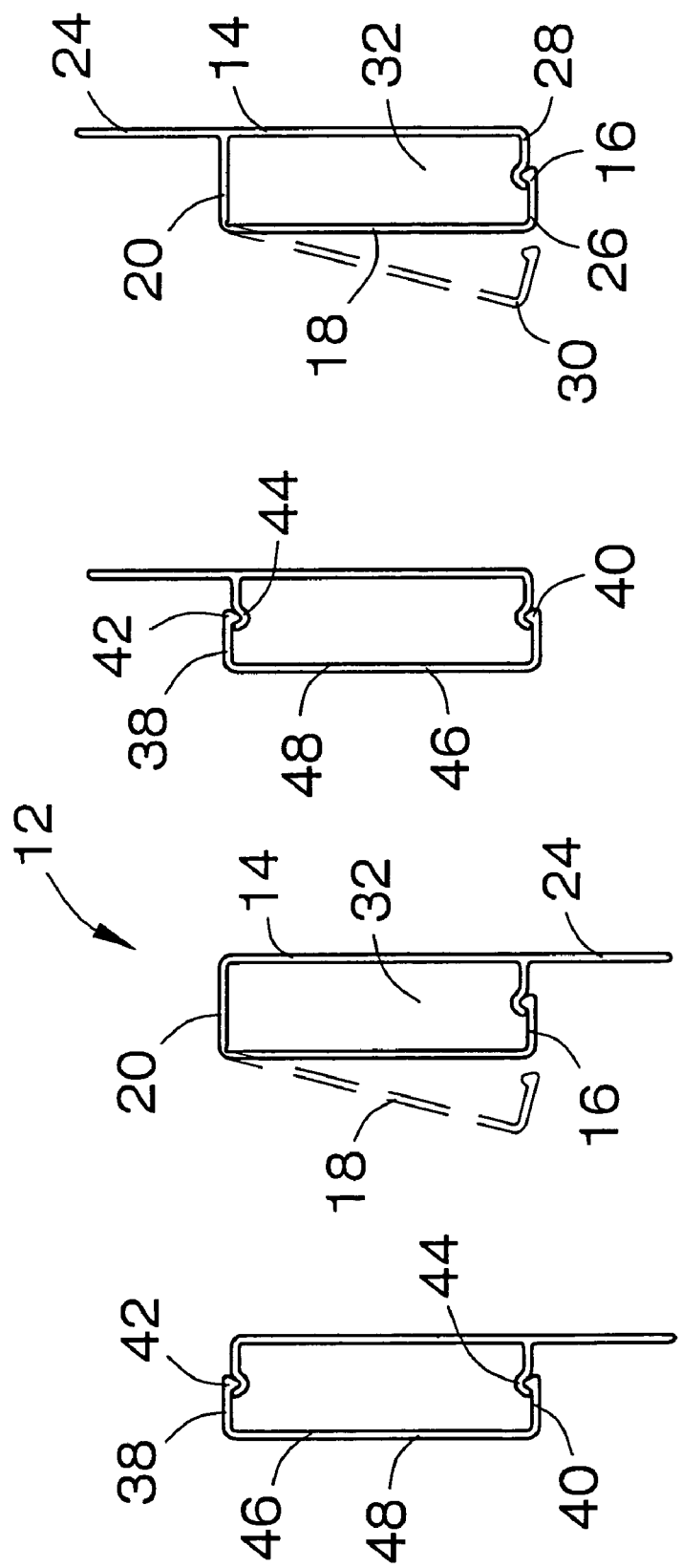

SIDING BOARD AND CONDUIT HOLDING SYSTEM

BACKGROUND OF THE INVENTION

1. Field of the Invention

The present invention relates to siding panels and more particularly pertains to a new siding panel for providing a user with an easier method for installing wiring and cable on the exterior of a structure in a hidden manner.

2. Description of the Prior Art

The use of siding panels is known in the prior art. U.S. Pat. No. 5,836,113 describes a system for securing and finishing exterior siding panels such that wires or cables may be run through a gap between the snap-in trim piece. Another type of siding panel is U.S. Pat. No. 4,841,699 describing a wall panel with accessible interior channels for laying cables in. U.S. Pat. No. 5,214,890 describes an office panel that will accommodate wires and cables not requiring electrical conduit.

While these devices fulfill their respective, particular objectives and requirements, the need remains for a system with multiple sections that can be used in conjunction with each other to create a uniform and seamless appearance while hiding wiring on an exterior of a dwelling.

SUMMARY OF THE INVENTION

The object of the present invention is to provide a new siding panel that would be easy to use and save the user time and money when installing additional wiring to a house or other structure.

Still another object of the present invention is to provide a new siding panel that provide an attractive and uniform appearance that would blend in with a building's current exterior siding.

To this end, the present invention generally comprises a siding border and conduit holding system for forming the border of a dwelling wall while holding wiring and other like conduits. The system comprises a plurality of elongated compartments each including a first wall, a second wall, a third wall, a fourth wall and a pair of end walls. The first and third walls are positioned opposite of each other. The second wall has a break therein to define a first portion and a second portion. The first portion is frictionally couplable to the second portion. The third wall is pivotally coupled to the fourth wall such that the third wall defines a door. At least one of the elongated compartments may be positioned along an edge of the dwelling wall such that the first wall is attached to the dwelling wall. Wiring is positionable within the compartments to be extended along the dwelling wall.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty, which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a cross-sectional view taken along the line 2—2 FIG. 1 of the present invention.

FIG. 3 is an end view of the present invention.

FIG. 4 is cross-sectional view taken along the line 4—4 of FIG. 1 of the present invention.

FIG. 5 is an end view of the present invention.

DESCRIPTION OF THE PREFERRED EMBODIMENT

Figure 1:
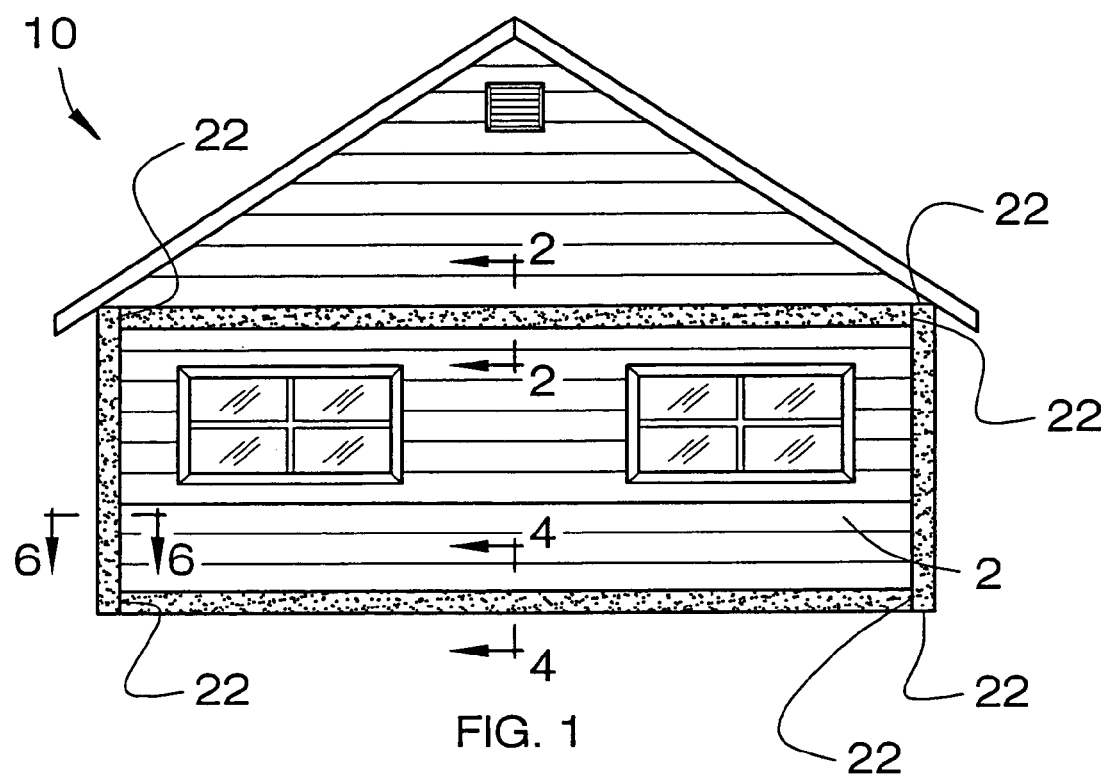
FIG. 1 is a front in-use view of a siding board and conduit holding system according to the present invention.
Figure 6:
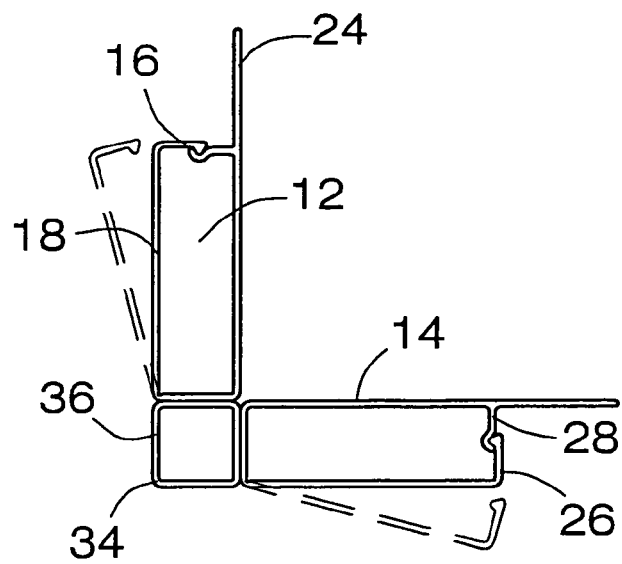
FIG. 6 is a cross-sectional view taken along the line 6—6 FIG. 1 of the present invention.

With reference now to the drawings, and in particular to FIGS. 1 through 6 thereof, a new siding panel embodying the principles and concepts of the present invention and generally designated by the reference numeral 10 will be described.

As best illustrated in FIGS. 1 through 6, the siding board and conduit holding system 10 generally comprises a device for holding wiring and the like along the border of a dwelling wall 2. The system comprises a plurality of elongated compartments 12. Each of the compartments 12 includes a first wall 14, a second wall 16, a third wall 18, a fourth wall 20 and a pair of end walls 22. The first wall 14 and third wall 18 are positioned opposite of each other. A panel 24 is attached to and extends along a length of a juncture of the first 14 and second 16 walls. The panel 24 is generally co-planar with the first wall 14. The second wall 16 has a break therein to define a first portion 26 and a second portion 28. The first portion 26 is frictionally couplable to the second portion 28. The third wall 18 is pivotally coupled to the fourth wall 20 such that the third wall 18 defines a door 30 for accessing an interior 32 of the compartment 12.

A corner section 34 comprises an elongated member 36 having a substantially square-shaped cross-section orientated transverse to a longitudinal axis of the corner section 34. A pair of adjacent sides of the corner section 34 is attached to a pair of fourth walls 20 such that the respective pair of compartments 12 forms a corner section 34 for selectively positioning against a corner of the dwelling wall 2. Preferably, the corner section 34, the compartment 12 and the panel 24 each have an outer surface having a texture embedded therein resembling a wooden panel. Preferably, the compartments 12, panels 24, and corner sections 34 are comprised of synthetic plastic material including, but not limited to, vinyl.

Additionally, second embodiments are depicted in FIGS. 2 and 4 wherein each of the second 38 and fourth 40 walls have a break 38 therein such that first 42 and second 44 portions are formed in the second 38 and fourth wall 40. The third wall 46 and attached sections of the second 38 and fourth 40 walls defines a cover 48. The first 42 and second 44 portions are frictionally coupled together in much the same way as the embodiment depicted in FIGS. 3 and 5.

In use, one of the elongated compartments 12 may be positioned along a top edge of the dwelling wall 2 such the associated panel 24 abuts the dwelling wall 2 and extends downward, one of the elongated compartments 12 may be positioned along a bottom edge of the dwelling wall 2 such the associated panel 24 abuts the dwelling wall 2 and extends upward, and compartments 12 with attached corner sections 34 may be positioned over and attached to the corners of the dwelling wall 2. The first walls 14 are attached to the dwelling wall 2 with conventional mechanical fasteners including nails, screws and brackets. Wiring may selectively be positioned within the compartments 12 such that the wiring is extended along the dwelling wall 2. This allows for easy movement of the wiring along the wall as well as for having access to the compartment 12 for the addition or removal of wiring. The compartments are textured as siding to match the dwelling wall 2.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A siding border and conduit holding system for forming the border of a dwelling wall, said system comprising:
   a plurality of elongated compartments each including;
      a first wall, a second wall, a third wall, a fourth wall and a pair of end walls, said first wall and third wall being positioned opposite of each other, said second wall having a break therein wherein a first portion and a second portion are defined, said first portion being frictionally couplable to said second portion, said third wall being pivotally coupled to said fourth wall such that said third wall defines a door;
      a panel being attached to and extending along a length of a juncture of said first and second walls, said panel being generally co-planar with said first wall; and
   wherein at least one of said elongated compartments is selectively positionable along an edge of the dwelling wall such that said first wall is attached to the dwelling wall and such that said panel extends along the dwelling wall, wherein wiring may selectively be positioned within said compartments such that the wiring is extended along the dwelling wall.

2. The siding border and conduit holding system as in claim 1, further including a corner section comprising an elongated member having a substantially square-shaped cross-section orientated transverse to a longitudinal axis of said corner section, wherein a pair of adjacent sides are attached to a pair of fourth walls such that the respective pair of compartments forms a corner section for selectively positioning against a corner of the dwelling wall.

3. The siding border and conduit holding system as in claim 1, wherein said compartment has an outer surface having a texture embedded therein.

4. The siding border and conduit holding system as in claim 1, wherein at least one of said elongated compartments is selectively positionable along a top edge of the dwelling wall such the associated panel abuts the dwelling wall and extends downward, wherein at least one of said elongated compartments is selectively positionable along a bottom edge of the dwelling wall such the associated panel abuts the dwelling wall and extends upward.

5. A siding border and conduit holding system for forming the border of a dwelling wall, said system comprising:
   a plurality of elongated compartments each including;
      a first wall, a second wall, a third wall, a fourth wall and a pair of end walls, said first wall and third wall being positioned opposite of each other, a panel being attached to and extending along a length of a juncture of said first and second walls, said panel being generally co-planar with said first wall, said second wall having a break therein wherein a first portion and a second portion are defined, said first portion being frictionally couplable to said second portion, said third wall being pivotally coupled to said fourth wall such that said third wall defines a door;
   a corner section comprising an elongated member having a substantially square-shaped cross-section orientated transverse to a longitudinal axis of said corner section, wherein a pair of adjacent sides of the corner section are attached to a pair of fourth walls such that the respective pair of compartments forms a corner section for selectively positioning against a corner of the dwelling wall;
   said corner section, said compartment and said panel each having an outer surface having a texture embedded therein; and
   wherein at least one of said elongated compartments is selectively positionable along a top edge of the dwelling wall such the associated panel abuts the dwelling wall and extends downward, wherein at least one of said elongated compartments is selectively positionable along a bottom edge of the dwelling wall such the associated panel abuts the dwelling wall and extends upward, wherein a pair of compartments and an associated one of said corner sections is selectively positionable against a corner of a dwelling and wherein wiring may selectively be positioned within said compartments such that the wiring is extended along the dwelling wall.

6. A siding border and conduit holding system for forming the border of a dwelling wall, said system comprising:
   a plurality of elongated compartments each including;
      a first wall, a second wall, a third wall and a fourth wall, said first wall and third wall being positioned opposite of each other, said second wall having a break therein wherein a first portion and a second portion are defined, said first portion being frictionally couplable to said second portion, said third wall being pivotally coupled to said fourth wall such that said third wall defines a door;
      a panel being attached to and extending along a length of a juncture of said first and second walls, said panel being generally co-planar with said first wall; and
   wherein at least one of said elongated compartments is selectively positionable along an edge of the dwelling wall such that said first wall is attached to the dwelling wall and such that said panel extends downward along the dwelling wall, wherein wiring may selectively be positioned within said compartments such that the wiring is extended along the dwelling wall.

* * * * *